United States Patent [19]

Nebiker et al.

[11] 4,053,223
[45] Oct. 11, 1977

[54] DOCUMENT PLATEN COVER FOR PHOTOCOPY MACHINE

[75] Inventors: Arthur W. Nebiker, Stamford, Conn.; Daniel N. Yanofsky, Jericho, N.Y.

[73] Assignee: Pitney-Bowes, Inc., Stamford, Conn.

[21] Appl. No.: 647,889

[22] Filed: Jan. 9, 1976

[51] Int. Cl.² ............................................. G03B 27/62
[52] U.S. Cl. ..................................................... 355/75
[58] Field of Search ....................... 355/50, 51, 75, 25, 355/47, 18

[56] References Cited

U.S. PATENT DOCUMENTS

| | | | |
|---|---|---|---|
| 3,612,684 | 10/1971 | Jones et al. | 355/75 X |
| 3,717,411 | 2/1973 | Niesen et al. | 355/75 |
| 3,726,589 | 4/1973 | DiFulvio et al. | 355/75 X |
| 3,813,161 | 5/1974 | Curtis | 355/75 |
| 3,912,389 | 10/1975 | Miyamoto | 355/75 X |
| 3,941,473 | 3/1976 | Goffe | 355/75 |

FOREIGN PATENT DOCUMENTS 2,245,263  3/1974  Germany ................................. 355/75

Primary Examiner—Donald A. Griffin
Attorney, Agent, or Firm—Thomas R. FitzGerald; William D. Soltow, Jr.; Albert W. Scribner

[57] ABSTRACT

A combined document cover and document storage assembly for a copying machine which copies both flat sheet documents and thick book documents. The document cover is hinged to the copyier along the edge remote from the operator so that the operator lifts the cover in an upward and rearward arcuate movement. The cover has a document holding pocket along the upper rear edge thereof for receiving the edges of a stack of documents placed on the cover to hold the documents in place when the cover is lifted, the pocket having a slanted wall in order to cause the documents to overlap each other by a small amount to facilitate grasping the uppermost document. The cover cooperates with the top wall of the housing of the copying machine in order to permit stacking of the documents after they have been copied in a manner which permits checking each successive copy with the original to be sure that the document is copied and to facilitate restacking of the documents in order corresponding to the order of the copies as these are stacked in exiting from the copying machine.

10 Claims, 5 Drawing Figures

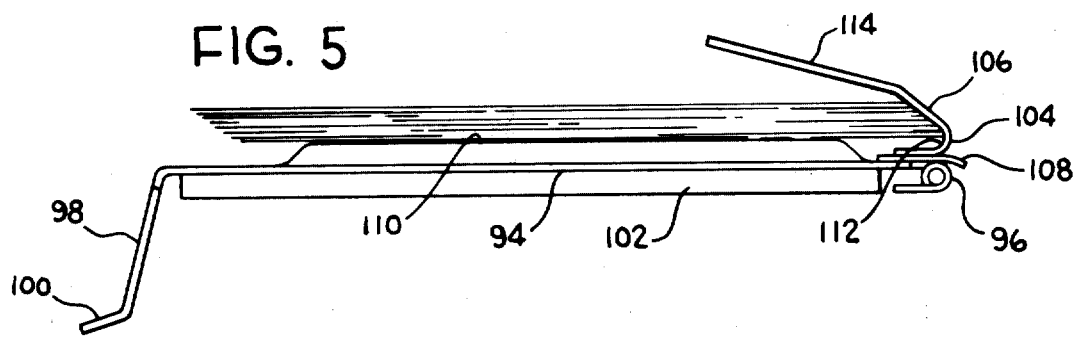
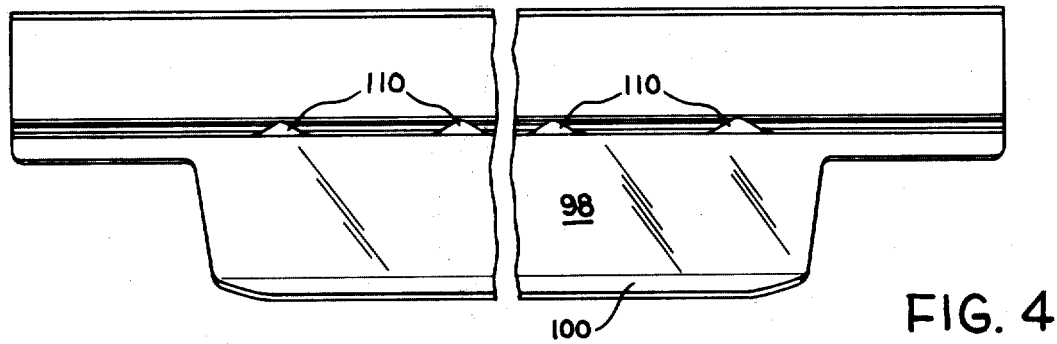
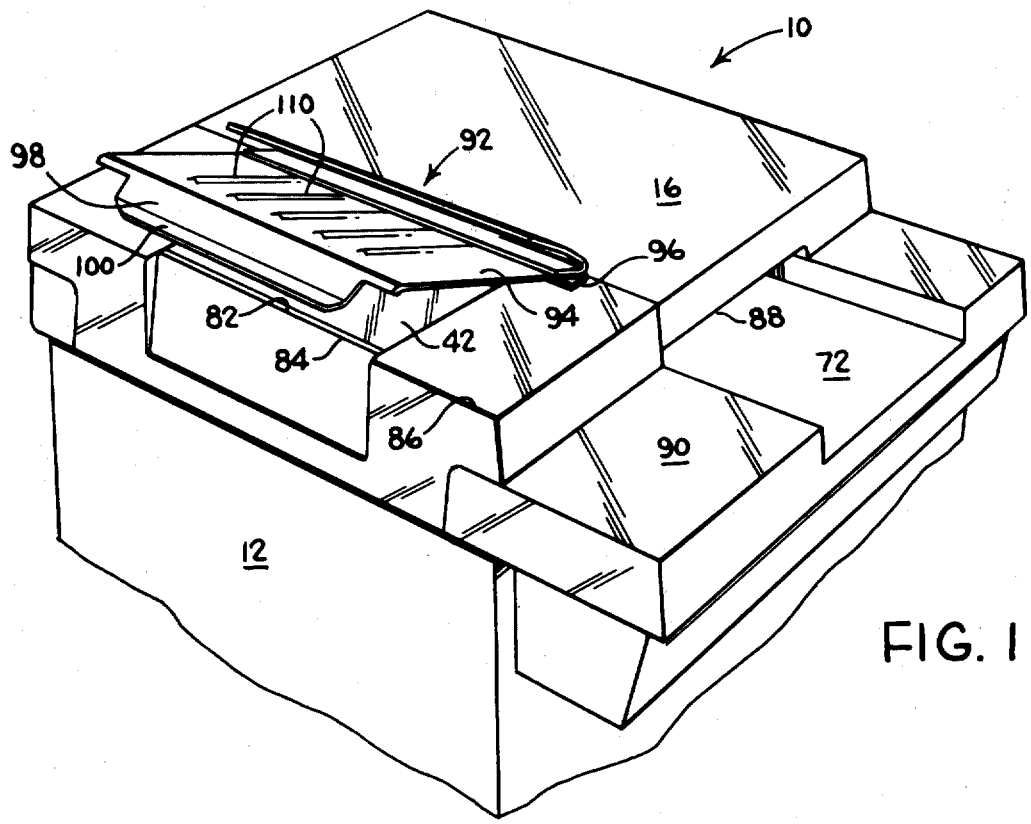

4,053,223

DOCUMENT PLATEN COVER FOR PHOTOCOPY MACHINE

BACKGROUND OF THE INVENTION

A typical photographic copying machine is provided with a transparent platen which supports a document during the copying process. The copying machine includes an optical system and various processing means for projecting an image of the graphic information on the original document to a photoconductive member thereby creating a latent electrostatic image of the document information on the photoconductive member. By operation of suitable instrumentalities, the latent image is developed on the photoconductive member by the application of colored marking material 5 which material either permanently adheres to the photoconductive member or is transferred to another support material, usually plain paper, depending on whether the photoconductive member is in the form of copy paper coated with a photoconductive substance which constitutes the final copy of the orginal document or is an intermediate, reusable photoconductive member from which the developed image is transferred to ordinary paper. In either type of machine, the orginal document is illuminated by a source of high intensity light in order to expose the photoconductive member and to cause discharge of the member in the light struck areas to develop the latent electrostatic image on the member. Typical techniques for illuminating the document are scanning, which involves relative movement between the original document and the source of illumination, or by full-frame high intensity flash exposure of the document while both the document and the light source remain stationary even though the photoconductive member may be moving at the instant of the flash of illumination.

Regardless of the type of photoconductive member utilized in the copy machine and regardless of the illumination technique utilized in eiher type of machine, it is necessary to shield the eyes of the operator of the copy machine from rays of light from the illuminating source during the exposure portion of the copying cycle. Typically, the transparent platen on which the document is placed is dimensioned to be slightly larger than the maximum size document which the copying machine is capable of reproducing, thereby resulting in a small amount of light being able to pass beyond the borders of the document. In addition, the principal use of most copying machines is in the reproduction of documents which are smaller than the maximum size document which the copying machine can reproduce with the result that a considerable amount of light can pass beyond the borders of most documents being copied. Since the degree of illumination is quite intense, to the point of being momentarily blinding in the case of flash illumination copying machines, it is necessary to provide a cover for the transparent platen which will effectively prevent any direct rays of light from the illuminating source from striking the eyes of the operator.

Another important reason for providing a cover for the transparent platen is to provide a reflecting surface for the rays of light passing beyond the borders of the document being copied so that all portions of the photoconductive member within the optical field of the copying machine will be lightstruck in order to discharge the photoconductive member in these areas. This will prevent the deposition of any marking material on the photoconductive member except in the image area so that nothing will appear on the copy sheet except the image of the document even though the document may be smaller than the copy sheet.

Over the years, many different types of document covers have been developed and marketed for copying machines having transparent document receiving platens. One early form of cover which has been used extensively is simply a flexible, usually rubber, mat connected to the housing of the copying machine adjacent one edge of the transparent platen and provided with a handle adjacent the opposite edge by which the cover can be lifted by the operator with one hand while a document is placed on the transparent platen, after which the cover is replaced over the document. The cover is provided with a white undersurface in order to reflect any light passing beyond the borders of the document. Although this form of cover functioned fairly well initially, it had several drawbacks and its useful life was substantially limited. This type of cover is generally hinged along the short edge of the glass platen and, in order to remove it, it is necessary for the operator to grasp the opposite short edge and swing the cover a considerable distance along the long edge of the transparent platen in order to insert a document. If an operator had a large number of documents to copy, it soon became very tiring for the operator to continuously swing the cover from a closed to an open position and back for each document. To avoid this, operators would operate the machine with the cover left open, which is detrimental to the operator's vision and also results in considerable deposition of marking material on the portions of the photoconductor within the optical field of the copying machine but beyond the borders of the document, which considerably shortens the life of a reusable photoconductive member and produces undesirable border markings in the case of the photoconductive copy paper when a small document is being copied. Another disadvantage of the rubber mat type platen cover is the fact that the rubber begins to wear out and crack, particularly along the portion connected to the housing of the copying machine after many thousands of flexures in the course of use of the copying machine. This necessitates frequent change of covers. A further disadvantage is that the white undersurface of the cover soon becomes permanently soiled due to dirt particles becoming embedded in the surface material as the result of continuous flexure of the platen cover. This results in poor copy quality, or "background", since the dirt on the underside of the platen cover is reproduced as part of the image on the copy where the undersurface of the cover is exposed to the photoconductive member beyond the borders of the document.

Partly as a result of these, as well as other, disadvantages of the flexible platen covers, rigid covers were developed which provided certain advantages over the flexible type covers in that they could be manipulated more easily by the operator of the copy machine, they were not as susceptible to becoming soiled due to lack of continuous flexure, and they have proved to be much longer lasting in operation. Typical of such covers are those illustrated in U.S. Pat. Nos. 3,615,134; 3,642,371 and 3,813,161.

SUMMARY OF THE INVENTION

The present invention relates generally to a rigid type platen cover for a copying machine and more particularly to a cover of this type which is designed to facilitate the handling of original documents in the copying process in addition to providing the necessary functions of such a cover as described above.

The cover of the present invention comprises generally a relatively rigid rectangularly shaped body member which is adapted to overly the transparent platen of a copying machine and the document when the latter is placed on the platen for copying, the body member having a flat planar portion which is dimensioned at least to cover the transparent platen of the copying machine and having a lower surface which is normally juxtaposed with the transparent platen. A suitable hinge means is disposed along one edge of the flat portion of the body portion for pivotally connecting the body member to the copying machine so that the body member can be moved to a raised position in which the transparent platen is exposed to facilitate the placing or removing of documents. A suitable grasping means is disposed adjacent the opposite edge of the body member for grasping the body member for movement thereof between the normal position overlying the platen and the raised position. In addition, there is a means on the body member for retaining documents on the upper surface thereof when the body member is moved to the raised position.

More particularly, the document retaining means is in the form of a pocket defining member extending along the edge of the body member which is hinged to the copying machine, the pocket opening toward the opposite edge of the body member, so that a plurality of documents placed on the body member will be held in position by the pocket defining means when the platen cover is raised to its upper position. The pocket defining means is shaped in such a way that the documents will normally lie in a slightly overlapped or fanned relationship to facilitate separating and lifting the uppermost document from the stack with the cover in its raised position in order to place the document on the transparent platen.

The platen cover is constructed in such a way as to cooperate with the location of the transparent platen on the copying machine so that a portion of the cover projects downwardly in interfering relationship with rays of light emitting from the transparent platen when the cover is in a slightly elevated position, as when it is placed upon a thick original document such as a book, thereby preventing the rays of light from striking the eyes of the operator.

Having briefly described the general nature and construction of the present invention, it is a principal object thereof to provide an imroved platen cover for a copying machine which functions as an aid in the handling of documents in the copying process.

It is another object of the present invention to provide a platen cover for a copying machine which supports a plurality of documents thereon and retains the documents in position for easy removal of successive documents by the copying machine operator when the cover is in its raised or open position.

It is still another object of the present invention to provide a platen cover for a copying machine which protects the eyes of the operator from direct rays of light from the illuminating source of the copying machine even though the cover is slightly raised during copying of a thick original document.

It is yet another object of the present invention to provide a platen cover for a copying machine which is constructed to cooperate with certain features of the copying machine to facilitate orderly copying of successive documents and stacking of the documents in the same order as the stacking of copies.

It is yet another object of the present invention to provide a document cover for a copying machine which is inexpensive to manufacture, is long lasting and is easy to manipulate by the operator of the copying machine.

These and other objects and advantages of the present invention will become more apparent from an understanding of the following detailed description of a preferred embodiment of the invention when considered in conjuncton with the accompanying drawings in which:

FIG. 1 is a perspective view of a portion of the outer housing of a typical electrophotographic copying machine showing the platen cover of the present invention thereon in a slightly raised position;

FIG. 4 is a front view of the platen cover of the present invention; and

FIG. 5 is an end view of the platen cover.

Detailed Description of the Preferred Embodiment of the Invention

Figure 3:
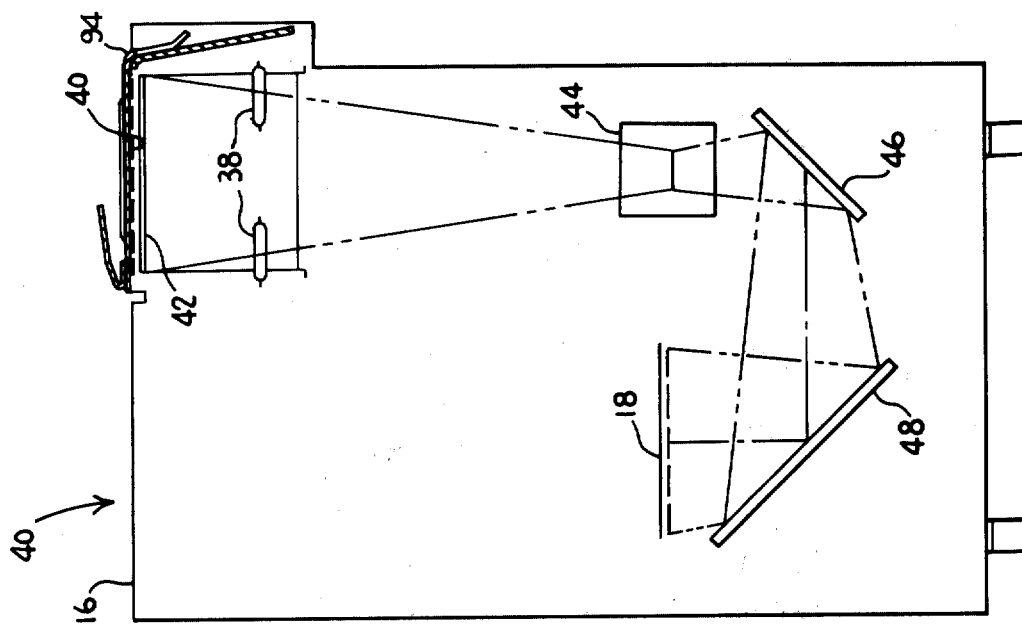
FIG. 3 is a schematic, lateral sectional view through the copying machine of FIG. 1.
Figure 2:
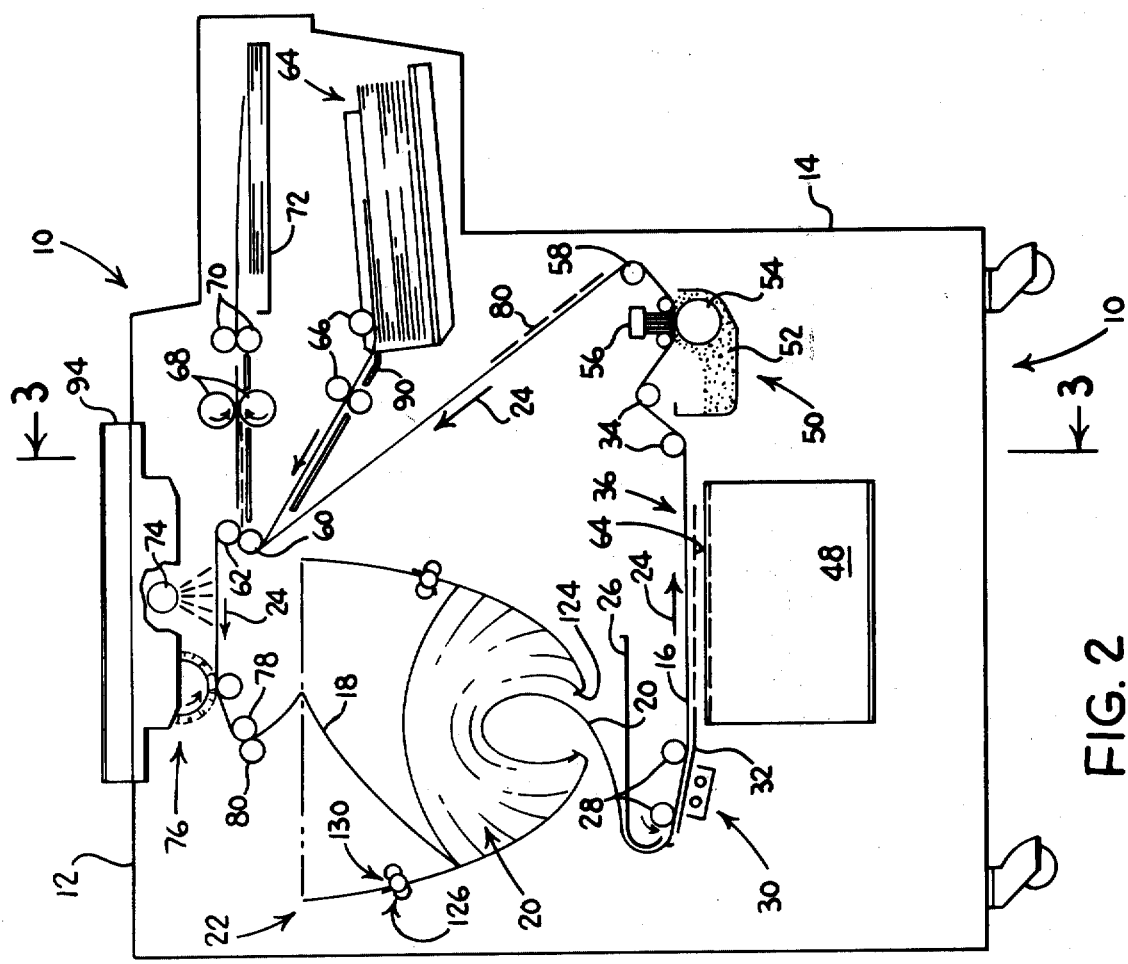
FIG. 2 is a schematic, longitudinal sectional view through the copying machine shown in FIG. 1.

Referring to FIGS. 1 through 3 of the drawings, the reference numeral 10 indicates generally an electrophotographic copying machine incorporating the principles and features of construction of the present invention. The copying machine includes a housing defined by four vertical walls and a top wall, one of the vertical walls 12 being hereafter deemed a front wall, and another of the vertical walls 14 being deemed a side wall for reference purposes. The housing also includes a top wall 16, and all of the aforementioned walls are connected to a suitable frame which provides a support for the components of the copying machine hereinafter described. The details of the frame are not shown since they form no part of the present invention.

The copying machine disclosed is of the type which utilizes a reusable photoconductive member on which an image of the indicia on a document is developed and is then transferred to plain paper. In the machine disclosed, the photoconductive member consists of an endless belt 18 of which a large portion thereof 20 is in the form of a fan-folded mass which is normally stored within a magazine assembly 22. The photoconductive member, by suitable structure hereinafter described, is withdrawn from the bottom of the magazine 22, and is guided past the several processing components of the copying machine and deposited back into the magazine 22 from the top thereof, the direction of motion of the photoconductive member being as indicated by the arrows 24 in FIG. 2.

After exiting from the bottom of the magazine 22, the photoconductive member passes around a guide plate 26 and then between a guide roller 28 and a corona charging device 30 which applies a uniform electrostatic charge to the photoconductive surface of the photoconductive member. Another pair of guide rollers 32 and 34 define a plane 36 in which a portion of the photoconductive member 18 lies for exposure by the optical system shown in more detail in FIG. 3.

Referring to FIG. 3, the optical system comprises a suitable light source 38 and reflectors (not shown) for directing light onto the underside of a document 40 which is resting on a glass platen 42 disposed in the top cover 16 of the machine. Rays of light are reflected from the document downwardly through a lens 44 to a first reflecting mirror 46 which directs the light rays horizontally to a second reflecting mirror 48 which in turn reflects the light rays upwardly to the underside of the section of photoconductive member 18 disposed at the exposing station 36. The exposure of the photoconductive member is accomplished by a short duration, high intensity flash of the illuminating means 38 so that the entire area of the original document 40 is illuminated and projected onto the photoconductive member while the photoconductive member is moving through the exposure station 36. The exposure of the photoconductor causes the charge applied by the charging device 30 to be dissipated in the background or light struck areas, thereby leaving a latent electrostatic image on the photoconductive member in the image or non-light struck areas.

The photoconductive member is then drawn through a developing device 50 of the magnetic brush type, the developing device containing a supply of magnetic developing material 52 and an applicator roller 54 which cooperates with an external magnet 56 to cause toner particles to be deposited on the photoconductive member to thereby develop and render visible the latent electrostatic image on the photoconductive member.

The photoconductive member passes around a guide roller 58 and then to a pair of cooperating rollers 60 and 62 which define a transfer station at which the toner image residing on the photoconductive member is transferred to plain paper. A supply of copy paper 64 is stored in the machine, and sheets of copy paper are fed by a suitable feeding device 66 along a path which brings the copy paper into contact with the photoconductive member between the member and the roller 60. The toner image is transferred to the copy paper which then follows a straight path to and through any suitable fusing device indicated by the cooperating pressure rollers 68, after cooperating feed rollers 70 deposit the copy paper onto a receiving tray 72.

The photoconductive member passes around the upper roller 62 at the transfer station and passes under a light source 74 which discharges the remaining charge on the photoconductive member so that a suitable cleaning device 76 can effectively remove any remaining developing material which is not transferred to the plain paper. The photoconductive member then passes between an idler roller 78 and a drive roller 80 which cooperate to feed the photoconductive member through all of the previously described processing components. It will be noticed that the photoconductive member is pulled through the entire system from the bottom of the magazine 22, through the machine and back into the top of the magazine 22.

Referring now to FIGS. 1 and 2, it will be seen that the platen 42 of the copy machine is a generally rectangular sheet of glass which is mounted in coplanar relationship with the top wall 16 of the housing, and is located such that one edge 82 of the platen 42 is substantially coextensive with at least at portion 84 of the front edge 86 of the top wall 16. The sides of the platen 42 is selected to be commensurate, or slightly larger, than the area of the largest document which the copy machine can accommodate for copying.

The top wall 16 is provided with a lateral, slightly depressed extension which provides both the receiving tray 72 for finished copies which exit from the copy machine through a slit 88, and also a surface 90 adapted to receive documents which have been copied in a manner hereinafter described.

Referring now to FIGS. 1, 4 and 5, the platen cover, generally designated by the reference numeral 92 comprises a relatively rigid, generally rectangularly shaped body member 94 which is adapted to overlie the platen 42 of the copying machine and to overlie a document when the latter is placed on the platen for copying. The rectangular portion 94 is dimensioned to at least cover the platen of the copying machine and preferably to slightly overlap the three edges of the platen other than the front edge 82 mentioned above. The body member 94 is connected to a suitable hinge means 96, the hinge means being preferably of the so-called "piano hinge" type which extends along the entire length of the body member 94. The hinge means is secured to the upper wall 16 of the housing in position to have the body member 94 overlie the platen 42 when the body member is in its normal or operative position.

A depending wall 98 is formed integrally with the body member 94 along the front edge of the latter, the juncture of the body member 94 and the depending wall 98 being coextensive with the front edge 82 of the platen 42 when the cover is in its operative position. An outwardly protruding lip 100 is formed integrally with the depending wall 98 along the lower edge of the depending wall, the lip 100 serving as a means for grasping the platen cover 92 in order to raise and lower the platen cover in conjunction with operation of the copying machine. The purpose for the depending wall 98 is to provide a light shield or barrier in the path of light between the illuminating means of the copying machine and the operator's eyes so that the operator will not be blinded by the sudden flash of light being emitted from the copying machine when the machine is being operated to copy books or other thick original documents which prevent the platen cover 92 from lying flat on the platen 42. A pad 102 formed of any suitable film material and having a smooth, white lower surface is attached to the underside of the body member 94 and serves both as a cushion for maintaining thin sheet documents in flat condition on the platen 42 and also to provide a reflecting surface for light from the illuminating means in areas beyond the boundary of the document being copied in the event that the document is smaller than the area of the photoconductive member being exposed so that corresponding areas of the copy paper will appear without any undesirable image thereon.

The platen cover 92 is provided with a document retaining means disposed along the edge of the body member adjacent the hinge means 96. The document retaining means comprises a relatively rigid retaining member 104 which has a planar portion 106 disposed at an acute angle with respect to the body member 94 and defining therewith a pocket which opens towards the opposite or front edge of the platen cover 92 in order to receive the edges of documents placed on the upper surface of the platen cover to retain the documents in position on the upper surface when the platen cover is raised to its uppermost position. The body member 94 is provided with at least one extension finger 108 which abuts the upper surface of the top wall 16 of the copying machine in order to prevent the platen cover 92 from being raised to a full vertical position. It is desirable that the platen cover be elevated to no more than approximately an 80 degree angle with respect to the horizontal so that the documents will not fall over onto the upper wall of the copying machine and also to eliminate any possibility of the operator inadvertently operating the machine with the cover in its raised position, since the cover will fall to its normal position by gravity unless the operator holds the cover in its raised position.

An important feature of this invention is the provision of a plurality of upwardly projecting ridges 110 formed in the body member 94 which support the documents in a slightly elevated position with respect to the upper surface of the body member 94. In order to adjust for the height of the documents when supported by the ridges, a reverse curve portion 112 is provided in the retaining means 104 so that the juncture between the planar portion 106 and the reverse curve portion 112 of the document retaining means is approximately the same height as the upper edge of the ridges 110. The document retaining means preferably includes another planar portion 114 which provides a deeper pocket for retaining documents in order to add stability to the stack of documents when the cover is in its raised position.

To properly use the platen cover and document storage assembly of the present invention, the operator of the copying machine, in the course of copying a plurality of documents such as a multipage report, places the documents face down on the upper surface of the platen cover after first jogging the pages to make sure that they are reasonably aligned. The operator then raises the cover to cause the documents to become fanned or slightly overlapped as shown in FIG. 5, and then removes the top-most document, which will be the last page of the report, and places the document on the glass platen in position for copying. The cover is then lowered and the operator actuates the copying machine in whatever manner is provided for doing so, usually merely by pressing a "print" button. The copying machine operates in the manner above described to provide the copying which is deposited on the tray 72 with the image side facing up.

Once the operator is made aware that the document has been illuminated, either by an audible or visual signal of any type, the operator lifts the cover while the rest of the copying operation is taking place and removes the document just illuminated and places the document face up on the document receiving portion 90 of the upper housing wall. Usually the operator has sufficient time to so place the document before the copy exits from the copying machine. The operator then removes the next top-most document from the stack, which will be the next to last page of the report, and places it on the platen, closes the cover and actuates the copying machine. At this point, the operator has an opportunity to quickly examine the first copy which will have reached the copy receiving tray to assure that the copy is complete and of good quality and is in fact a copy of the same document that is lying face up along side of the copy.

By successively repeating these steps, it can be seen that the operator can quickly and efficiently copy successive documents in a predetermined order and end up with a stack of copies collated and stacked in proper order and with the documents stacked in proper order. Also, by quickly comparing each exiting copy with the adjacent document on the wall portion 90 the operator obtains assurance that each successive document has been properly copied.

What is claimed is:

1. A document cover for a copying machine having a platen on which documents are placed for copying, said cover comprising:
    A. a relatively rigid body member adapted to overlie the platen of the copying machine and a document when the latter is placed on the platen for copying, said body member having a flat planar portion dimensioned at least to cover the platen of the copying machine and having an upper surface opposite a lower surface normally juxtaposed the copying machine platen,
    B. means disposed along one edge of said flat portion of said body member for pivotally connecting said body member to the copying machine whereby said body member can be moved to a raised position in which the copying machine platen is exposed for placing or removing of documents,
    C. means disposed adjacent the opposite edge of said body member of grasping said body member for movement thereof between the normal position overlying the platen and said raised position, and
    D. a relatively rigid retaining means on said body member adjacent said one edge of said body member against which retaining means the documents bear and by which retaining means the documents are supported and retained in position on said upper surface of said body member of easy removal of successive documents by an operator when said body member is moved to its raised position.

2. A document cover as set forth in claim 1 wherein said document retaining means comprises means defining a pocket for receiving an edge of a document placed on said upper surface of said body member so as to retain the document in position on said surface when said body member is in said raised position.

3. A document cover as set forth in claim 2 wherein said pocket defining means extends along substantially the entire length of said one edge of said body member.

4. A document cover as set forth in claim 2 wherein said pocket defining means comprises a relatively rigid retaining member having a planar portion disposed at an acute angle with respect to said body member thereby causing a plurality of documents placed on said cover to be stacked in slightly overlapped relationship as the edges of the documents abut the surface of said retaining member adjacent said opposite surface of said body member.

5. A document cover as set forth in claim 4 wherein said body member includes a plurality of upwardly projecting ridges extending between said one edge and said opposite edge of said body member for supporting documents thereon to elevate the lowermost document above said opposite surface of said body member, and wherein said retaining member includes a reverse curve portion by which said planar portion of said retaining member is connected to said body member, whereby said planar portion terminates substantially at the plane of the uppermost point of said plurality of ridges.

6. In a copying machine having a frame and a plurality of processing means mounted in the frame for reproducing on copy paper the indicia of an original document to be copied and means for depositing successive copies in superposed relationship with the indicia side of the copies in view of the operator of the copying machine, a document storage assembly for storing a plurality of documents before and after each document is copied, said assembly comprising:

A. a housing for the copying machine mounted on said frame, said housing having a top wall, B. a transparent platen mounted on said housing in substantially co-planar relationship with said top wall, one edge of said platen being substantially co-extensive with at least a portion of one edge of said top wall, C. a substantially rigid platen cover mounted on said top wall adjacent the oppposite edge of said platen, said cover having an upper surface and a lower surface dimensioned at least to overlie said platen, D. means mounting said cover on said platen for pivotal movement about an axis substantially co-extensive with said opposite edge of said platen, E. lifting means on said platen cover adjacent said one edge of said platen, F. relatively rigid document retaining means on said upper cover surface adjacent said opposite edge of said platen cover against which retaining means the documents bear and by whih retaining means the documents are supported and retained in position on said upper cover surface for easy removal of successive documents by an operator when said cover is pivotally lifted about said mounting means, and G. means disposed adjacent said platen cover for receiving documents which have been copied.

7. A document storage assembly as set forth in claim 6 wherein said document retaining means comprises a relatively rigid retaining member mounted on said platen cover adjacent the edge thereof connected to said top wall, said retaining member being disposed generally at an acute angle with respect to said platen cover to define a pocket opening toward the opposite edge of said platen cover to receive the edges of documents lying on said platen cover and to retain the documents thereon when said platen cover is lifted to expose said platen.

8. A document storage assembly as set forth in claim 7 wherein said retaining member extends substantially the entire length of said platen cover so as to maintain a plurality of documents supported thereon in properly aligned, slightly overlapped relationship.

9. A document storage assembly as set forth in claim 6 wherein said platen cover includes a generally downwardly extending front wall portion connected to said platen cover in position to overlie a portion of a front wall of said housing, said front wall portion of said platen cover being adapted to shield the eyes of an operator of the copying machine from bright illumination during copying of a thick original document such as a book which prevents said platen cover from lying flat upon said platen.

10. A document storage assembly as set forth in claim 9 wherein said lifting means comprises an out-turned lip formed on the lower edge of said front wall portion of said platen cover to facilitate manual grasping of said platen cover for lifting the same.

* * * * *